United States Patent [19]
Beck

[11] Patent Number: 5,749,945
[45] Date of Patent: May 12, 1998

[54] APPARATUS FOR RAPIDLY DEGASSING AND DECONTAMINATING LIQUIDS

[76] Inventor: Earl Joseph Beck, 125 Feliz Dr., Oak View, Calif. 93022

[21] Appl. No.: 684,826

[22] Filed: Jul. 22, 1996

[51] Int. Cl.$^6$ ........................................ B01D 19/00
[52] U.S. Cl. .................... 95/248; 95/261; 96/195; 96/196; 96/208; 96/214; 96/215
[58] Field of Search .................. 95/248, 262, 266, 95/261; 96/194, 195, 197, 198, 187, 196, 200, 204, 206, 215, 216, 217, 220, 177, 208, 214, 207

[56] References Cited

U.S. PATENT DOCUMENTS

| | | | |
|---|---|---|---|
| 1,387,748 | 8/1921 | Wilson | 96/195 |
| 2,816,490 | 12/1957 | Boadway et al. | 96/195 |
| 3,201,919 | 8/1965 | Long | 96/195 |
| 3,529,405 | 9/1970 | Ashbrook | 96/195 |
| 3,616,599 | 11/1971 | Burnham, Sr. | 95/266 |
| 3,856,483 | 12/1974 | Rumpf et al. | 95/261 |
| 3,973,930 | 8/1976 | Burgess | 95/261 |
| 4,201,555 | 5/1980 | Tkach | 95/266 |
| 4,300,919 | 11/1981 | Lewis et al. | 95/266 |
| 4,430,098 | 2/1984 | Bowman et al. | 96/195 |
| 4,469,495 | 9/1984 | Hiraizumi et al. | 96/195 |
| 5,554,343 | 9/1996 | Wade | 96/195 |

*Primary Examiner*—C. Scott Bushey

[57] ABSTRACT

A system is described for rapidly removing dissolved permanent gasses or dissolved volatile contaminants from a liquid, in which the liquid is forced through a cavitating venturi, designed and operated in a fashion to produce micro-bubbles in the high-shear, converging flow section at its entry, to coalesce a significant fraction of these micro-air bubbles in a nominally straight section of maximum restriction following the inlet section, then in a final section, a diffuser, the steam bubbles condense, having during their lives caused coalescence of a significant fraction of the micro air bubbles, which are then, with the water carrying them separated from the remaining stream and its micro-bubbles. The stream separated carries large, easily broken air bubbles which then are broken in a suitable device (four are shown, each with a proposed best design for a specific size of system). The bubbles' contents, a mixture of air, volatiles and vapor are then sent to a vacuum system for processing to the atmosphere.

9 Claims, 6 Drawing Sheets

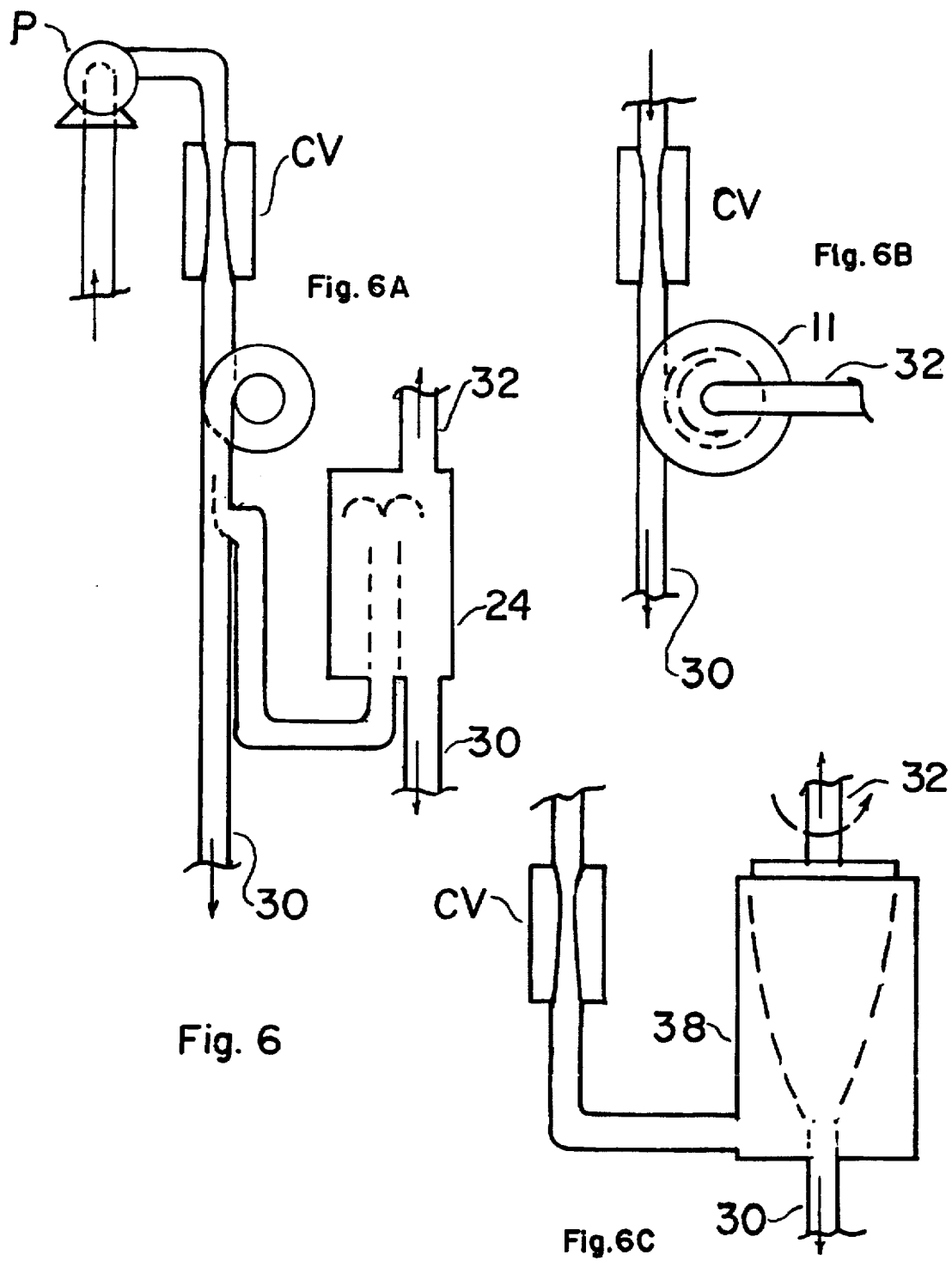

5,749,945

APPARATUS FOR RAPIDLY DEGASSING AND DECONTAMINATING LIQUIDS

BACKGROUND OF THE INVENTION

1. Field of the Invention

The present invention relates to systems for degassing liquids to remove unwanted permanent air gasses, as for example boiler feed water or removal of contaminants such as hydrogen sulfide, unwanted carbon dioxide, and radon. It further relates to systems for scrubbing contaminants from other gasses by contacting the contaminated gasses with relatively clean water, and extends this field to one wherein the liquid used for scrubbing is virtually completely cleaned of all dissolved gasses or volatile contaminants so that the scrubbing may be very complete and rapid. It further relates to the separation of dissolved gasses from industrial liquids, as for instance in removing dissolved hydrocarbon gasses from crude oil or removing dissolved gasses such as helium for storage and later use. It also relates to the instant evaporation of dissolved volatiles such as solvents contained in a liquid and removing them in the equipment to be described or suggested.

2. Description of the Prior Art

The three main types of systems which the present invention intends to improve on are (a) Deaerating devices such as open-air heated tanks for partial removal of dissolved permanent air gasses and other contaminants which may become gaseous in a boiler and reduce a boiler or other piece of industrial equipment's efficiency. (by Systems for holding a contaminated liquid under a partial vacuum, with or without heating, to volatilize and remove the contaminants by diffusion. (c) Systems generally known in the chemical industry as scrubbers, wherein a liquid contaminated with undesired permanent gasses or volatile liquids are sprayed to form drops or spread on high-surface area configurations, allowing diffusion of the undesired dissolved materials to the relatively uncontaminated gas with which it is placed in contact, usually but not necessarily air.

Under the process of the prior art, the liquid to be decontaminated is spread over a very large, thin layer that expedites degassing according to Fick's law of diffusion. A disadvantage of this prior art process is that it facilitates the evaporation of large and largely uncontrolled quantities of the liquid being cleaned. Since the vapor produced by evaporation carries with it the contaminant, a secondary stream of condensate is produced when the vapor is condensed out to facilitate the production of a vacuum. This condensate stream is more highly contaminated than the original liquid being cleaned. Thus this new liquid stream creates a second source of liquid with a concentrated contamination that must be treated. For instance, if the original contaminated liquid, say water, is initially contaminated with a noxious hydrocarbon such as benzene in the amount of $10^{-8}$ molecules of benzine per molecule of water, and further that the quantity of evaporation of water is 0.01 that of the contaminated feed stream, then a contaminated stream of condensate results, containing concentrated benzene in the amount of $10^{-6}$ molecules of benzene per molecule of condensate water. The net effect is that present systems using extended thin films on high-area surfaces provide a system that is very expensive to build., and which requires excessive refrigeration to condense the excess liquid evaporated. Further, as above this secondary stream produces a new source of highly contaminated liquid with a new and exaggerated disposal problem.

SUMMARY OF THE INVENTION

The present invention is a process for rapidly removing dissolved permanent gases and volatile contaminants from a liquid. This is accomplished by forcing the contaminated liquid stream through a cavitating venturi designed to not only free the dissolved air or other gasses and evaporate volatile contaminants, but then to coalescea sizeable fraction of the gas released, typically found in very small bubbles, to larger bubbles. The micro-bubbles are difficult to separate or break because their buoyancy is small compared with their resistance to rising under gravity. The larger bubbles coalesced are easily separated by low centrifugal forces and are relatively easily broke. By designing the equipment so that the liquid is not exposed in thin films, or for extended times and large areas to the low-pressure mixture of vapor and gas, the gas being released when the bubbles break, excessive evaporation is avoided. In the best case almost the only vapor that will be released is that necessary to saturate the gas bubbles. This is minimal because of the very high specific volume of wet steam at its very low partial pressures found in the system. Additional components of the system to accomplish the desired processes of separating the large bubbles, breaking them and removing their gaseous contents without additional significant evaporation are described in the patent specification. Their function is to not only separate the large, coalesced bubbles from the main stream carrying the micro-bubbles not coalesced, but to break them, at the same time isolating the main stream, which then can be further processed in second third stages or more stages while limiting contact of the liquid streams from the low pressure air-vapor released thereby limiting further evaporation. For example, the liquid may flow through one or more turns of tubing following its initial processing through title cavitating venturi. After centrifugal separation, the stream containing the large, soft bubbles is stripped from the main stream 12 in FIG. 1 and sent to one of several types of secondary bubble breakers and separators.

Because evaporation of the contaminated liquid can occur only at a free vapor-liquid surface or interface, it is the method and intention of this invention to limit insofar as practicable evaporation except to the gas bubbles. This process can best be understood by examining in some detail the total process and equipment design as they relate to Fick's law of diffusion:

$$\frac{dn}{dt} = \frac{DA(C_1 - C_2)}{\delta}, \quad (1)$$

where dn is the number of molecules moving, across an interface of thickness $\delta$, of area A, in a time dt, driven by a concentration gradient, $C_1-C_2$ at a rate determined by an experimental diffusion constant, D. One caveat. Eq.(1) is generally understood without qualification to be at constant pressure, and the concentration gradient the number of molecules, say of gas, per unit of liquid. Not so in this case where the concentration gradient is replaced by a solubility factor. With the large reduction in pressure—it may be by a factor to as high as 1/100th or greater in the throat of the cavitating venturi—the solubility is very low and the dissolved constituents—gas or volatile molecules—move from wherever they occur in the contaminated liquid against the concentration gradient until a new solubility saturation in the liquid at the lower pressure is achieved. For instance, in the practical case we approach in our design, a reduction in pressure to, say 1/30th of an atmosphere, or about 0.03 bar, the dissolved gas and volatilized contaminants will exit the liquid until a solubility saturation value at the lower pressure is reached, irrespective of the actual concentration. No matter; so far as is known, Equal.(1) holds in this case, where the moving force is as now re-defined in terms of solubility and solubility change with a change in pressure.

To reexamine the state of the art contactor, a large pressure vessel with extended surfaces supporting thin films of liquid, would be dictated by Eq.(1). The through-put of contaminated liquid is maximized by paying attention to the demands of diffusion as shown here. Just so in my new system, except that the diffusion is limited, insofar as practicable, to the bubbles (mostly air but containing the contaminant as a vapor). The large area, A, is achieved in the very large surface area of the bubbles of air, large and small. The diffusion distance, $\delta$, is minimized by the close spacing (due to their very large numbers) of the micro-bubbles formed in the venturi's throat: So far as is known, neither the diffusion constant, D nor the concentration gradient (or in its place the solubility deficit, as I now choose to call it) is changed by the new hardware I propose. In any case, diffusion to incipient micro-nuclei inherent in most liquids is extremely rapid; the entire removal down to the new solubility level is accomplished in a distance of tens of mms and a time of a few thousandths of a second. The further coalescence of these very small (hard) micro-air bubbles to large, soft air bubbles occurs in a further short time of perhaps a few or tens of thousands of a second, depending on equipment size, i.e. the length of the straight coalescing section 6 in FIG. 1.

To recap to this point. Micro air bubbles carrying the dissolved volatile or gaseous contaminant are formed in the intake section of the CV, then coalesced in the very large steam bubbles formed in the straight throat. These large steam bubbles, now containing air from the coalesced micro air bubbles are then condensed abruptly in the cavitating diffuser of the CV 8 in FIG. 1, which causes a rapid pressure rise to above the saturation pressure of the liquid being cleaned. The portion of the flow carrying the large air bubbles is then separated in a centrifugal separator for example, 10 in FIG. 1 from the part of the flow carrying the micro-bubbles not coalesced 16 in FIG. 1. The stream carrying the large bubbles is sent to a breaking device such as 24 in FIG. 2, and the bubbles'0 contents sent to the vacuum system. The equipment is designed to avoid insofar as practicable further contact of the degassed liquid with the low pressure air stream flowing to the vacuum system and further to keep that liquid in thick sections, effectively maximizing $\delta$ while minimizing A to prohibit insofar as is practicable evaporation of the liquid being cleaned. In the best possible design, almost no steam would be released except for the very small amount needed to saturate the air bubbles. The volume of the air bubbles then controls the total vapor released, and this is the heart of this patent application.

BRIEF DESCRIPTION OF THE DRAWINGS

FIGS. 6A, 6B, and 6C show three combinations of the novel components shown in earlier FIGS. 1 through 4, with each combination achieving the desired processes of the invention.

DETAILED DESCRIPTION OF THE INVENTION

Figure 1:
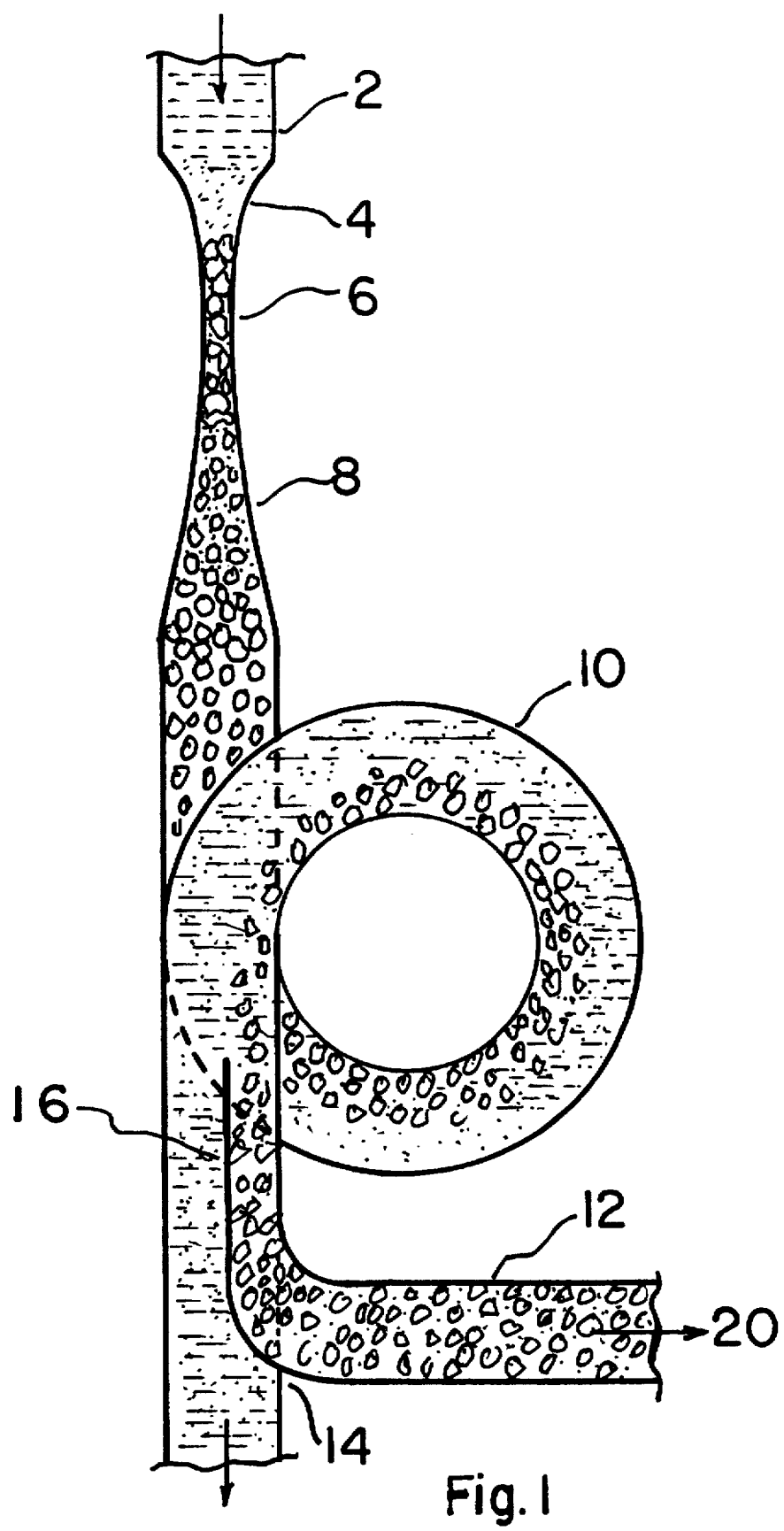
FIG. 1, shows a schematic of a longitudinal cross section of the Cavitating Venturi (CV) with three sections identified, the entrance nozzle 2, the straight section 6 and the diffuser 8, which empties into a centrifugal separator 10 in which the large air-vapor bubbles formed in the straight section are removed from the remainder of the liquid charge 16. The fraction of the liquid containing the large, easily broken bubbles 20 are then sent via duct 12 to a simple device for breaking the bubbles, releasing their contents which then go to the vacuum system not shown. The portion of the flow carrying very small micro-bubbles not coalesced in the first CV are then passed to a second CV, or more if necessary, allowing continuous staging to reduce the gas content of the liquid to virtually any desired level.

The functions of the various parts of the invention is as follows. First, referring to FIG. 1, the contaminated or gas-saturated liquid is introduced at a preferred velocity and pressure through the duct 2, which empties into the nozzle portion of the cavitating venturi (CV),which is made up of 4, 6 and 8. The straight section 6 is maintained It a suitable absolute pressure just below the saturation pressure of the liquid, as determined by the liquid's temperature. The stream is diffused to a final desired pressure in the conical section, the diffuser 8, designed according to Bernoulli's principle. The entry section of a CV can release dissolved gasses from solution into very small bubbles (estimated to be of 1μin diameter). One inventive aspect of the invention derives from the phenomena of small bubbles coalescing in a low-pressure throat of a CV.

Upon exit from 8, the stream now consists of a mixture of liquid, very small (uncoalesced) air-gas vapor bubbles and large bubbles coalesced in the straight section 6. The stream exiting 8 is rotated rapidly in a suitable circular duct 10, in which the large bubbles are moved by centrifugal force to the inner portion of 10 and 16, and from which the liquid stream containing the large bubbles is stripped from the flow into duct 12 in a suitable elbow 14. The remainder of the liquid flow, containing micro-bubbles of air, gas and vapor are passed to the next stage or stages, each of which consists of a CV and separation system as shown in this, FIG. 1.

Figure 2:
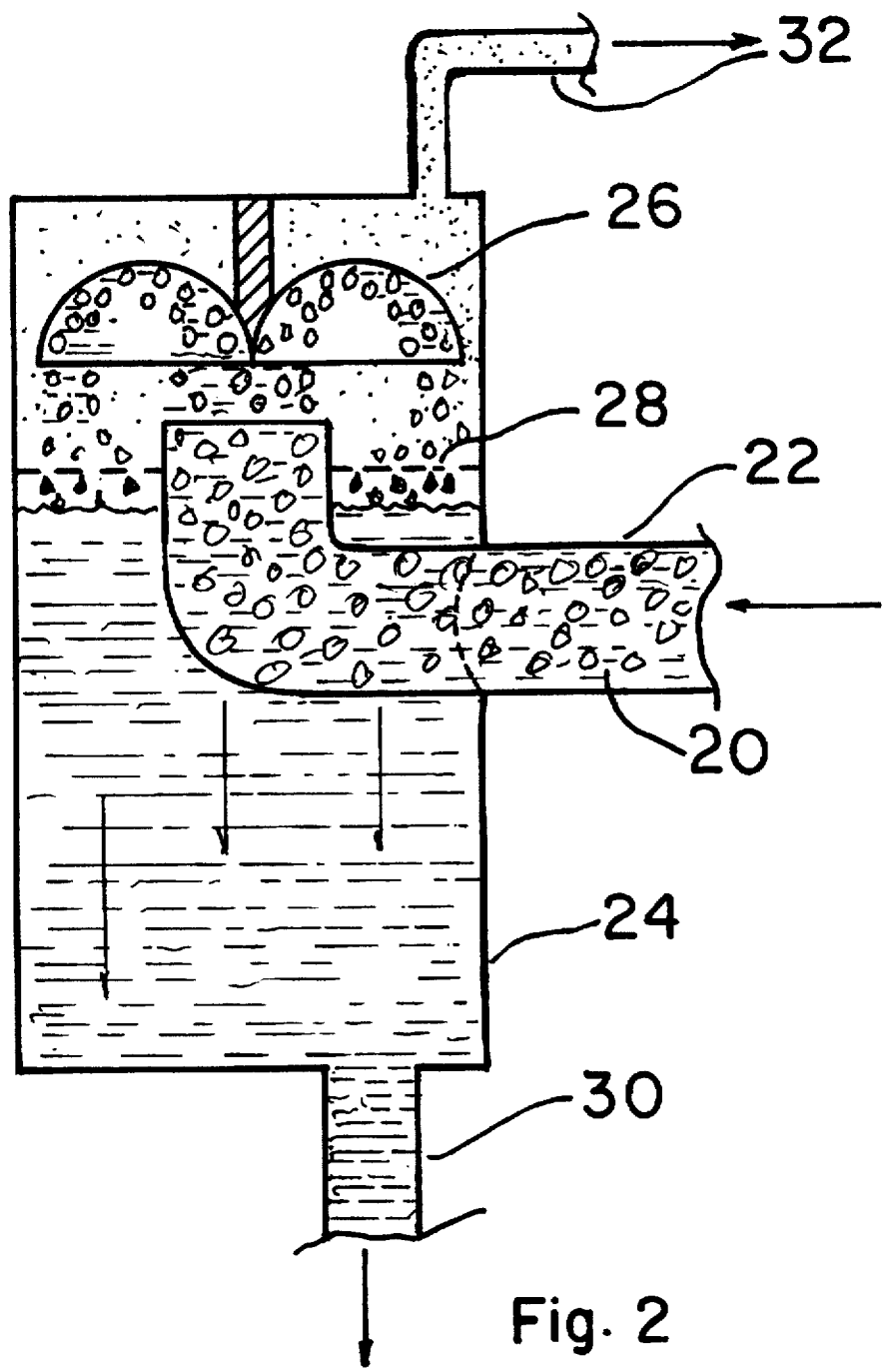
FIG. 2 shows a simple device 24 for breaking the large bubbles separated in the centrifugal separator shown in FIG. 1, useful in systems of limited through-put. This device also is usable as a simple centrifugal separator obviating, in some cases the need for the centrifugal separator 10 of FIG. 1.
Figure 3:
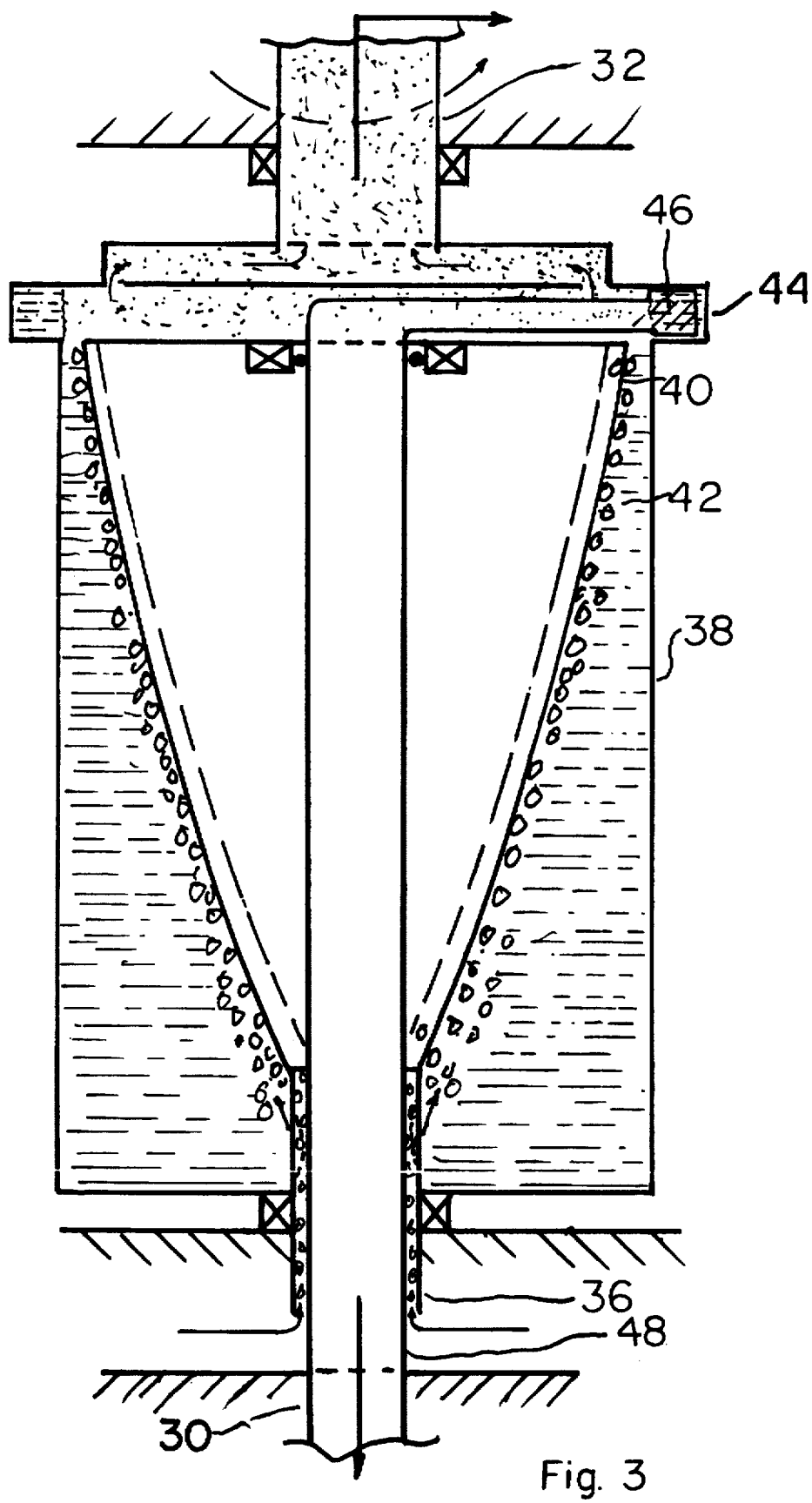
FIG. 3, shows a more complex device 38 capable of handling very large through-puts in large capacity systems. Like that in FIG. 2, it is capable of separating the large and very small bubbles following the CV, but it is believed that a best design would use a number of stages, each as shown in FIG. 1

FIG. 2 shows in section (all parts are circular in cross-section except for the scoop 46 in FIG. 3) a simple device for reversing the flow from a number of stages, through each stage's duct 12, combined into 20. The flow from 20 goes to bubble breaking devices such as are shown in FIGS. 2 and 3. In FIG. 2 1 show a stationary device with no moving parts that receives the stream 20 consisting of liquid carrying large bubbles or a mixture of large and small bubbles if the separator 10 is not used, which impinges on a surface of rotation 26. This breaks the bubbles by splashing and further by sending the reversed stream, now traveling downward, through a suitable metal screen 28. The liquid now separated from the gasses flow from the separator 24 through a duct 30 for final disposal, use, or further processing. The separated gasses, (vapor and contaminating gasses) are sent to the vacuum system for discharge and final disposal Note that if separator such as 10 is not used, the flow from 30 would go to a subsequent or stage or stages, each starting with a suitably sized CV to handle the flow, which now has part of its dissolved gasses and volatiles removed. Any number of stages may be utilized to achieve the desired level of decontamination or degassification.

An alternative separator suitable for very large systems (large contaminated liquid flows) is shown in FIG. 3. Here, the large bubble carried in a liquid stream as from 12 FIG. 1, is introduced through a rotating annular duct 36 discharging into a rotating cylinder 38, lined with a suitably shaped co-rotating parabolic cone 40. The bubbles 42 are rapidly separated to the outer surface of the cone 40 to its top, where the bubbles are broken as the stream is flung outward into a co-rotating annulus 44. From 44, the liquid now largely gas-free, is scooped up by a stationary scoop 46 by impact and the cleansed liquid is discharged from the system through a stationary duct 48. A note on the design on the approximately parabolic cone of rotation 40: The water would, without this solid cone assume a parabolic surface shown as a dashed line just inside 40 which would have the unfortunate trait of providing a large free surface for evaporation of the liquid exposed to the low pressure of the vacuum system. To avoid this undesired and uncontrolled evaporation, the cone is made slightly larger in diameter at every point than it would be if it coincided with the free surface of rotation. Thus the separated air-liquid (a foam) rising to the cone's top is sized to be fully wetted by the bubble-liquid mixture, so avoiding the undesired evaporation, a major function of this invention. Only in a very narrow annulus 44 at the top of the system is the liquid exposed to the vacuum system, and then in heavy layers and only very briefly. In terms of the lesson taught by Eq. (1), those factors promoting evaporation according to Fick's law are minimized, except as they relate to the formation of gas-vapor bubbles in the CV, where they are maximized. To a first approximation, the only liquid evaporated (none is desired for reasons stated earlier) is that necessary to saturate the air bubbles. The volume of vapor released to the air bubbles is the same as the volume of the volume of air in the bubbles, according to Dalton's law of partial pressures. When and if we learn to rapidly break very small micro-bubbles, that vapor will further be reduced as the permanent air gasses in the micro-bubbles is compressed, and so too the air's volume. According to Dalton's law of partial pressures, the volume of the vapor would be that of the air which since it must be compressed in the vacuum system, is minimized, thus reducing equipment size and power to drive the vacuum pumps.

Figure 4:
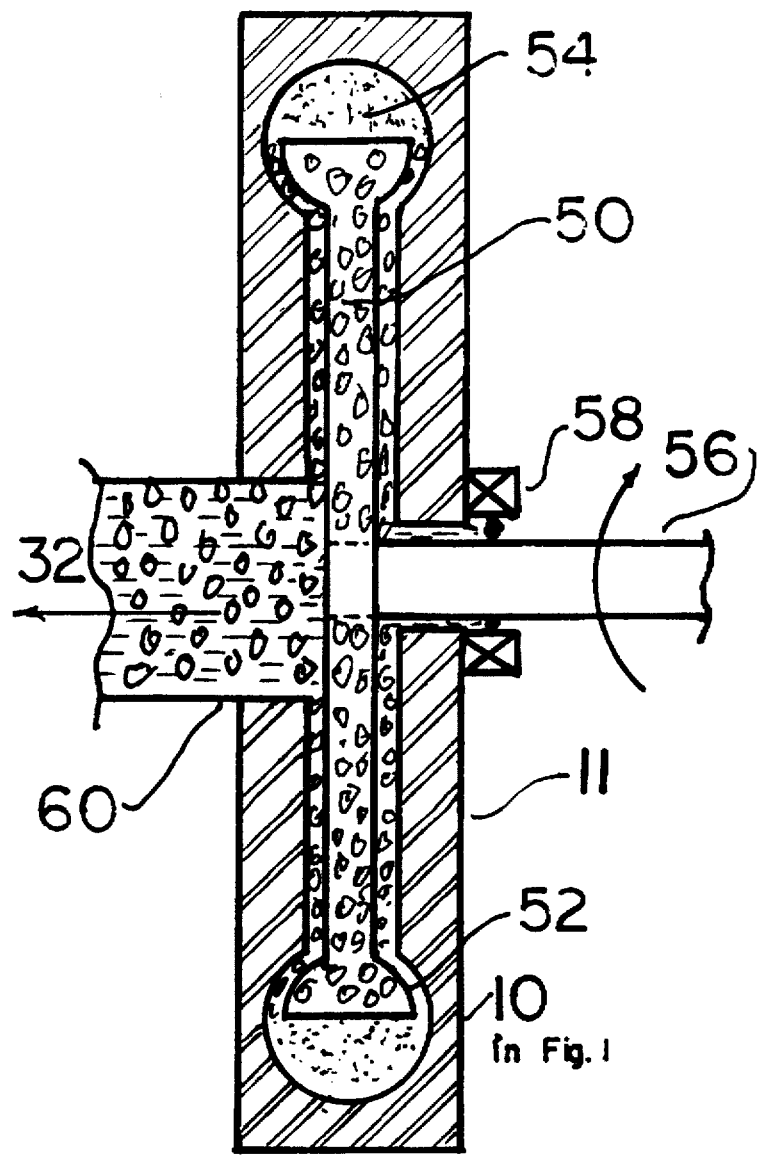
FIG. 4, shows an alternative separator and large bubble breaker 11 in section, with an impeller projecting through the inner layer of liquid carrying the large bubbles separated from the remainder carrying the micro-bubbles as shown in section in FIG. 1.

Another device 11 for separating and breaking the large bubbles is shown in FIG. 4, which shows an impeller 50 with half-vanes projecting through the inner, liquid layer containing large air-steam bubbles. The outer half-annulus of water contains those micro-bubbles not coalesced in the CV as in FIG. 1, as 54. The impeller is driven through a shaft 56, which is supported and sealed with a combination bearing and seal, 58. Experience has shown that the large air-steam bubbles are stable when rotating rapidly and under centrifugal force. The half-surface impeller acts as a centrifugal pump, expelling the liquid in the septa forming the bubbles to the outer layer, leaving the gasses behind. These separated gasses proceed to the vacuum system through duct 60, which performs as does 20 in FIG. 1. For large systems, this design has powerful advantages justifying the additional complexity, in that one device, similar in some respects to a centrifugal pump, can handle the output of any number of stages, as each consisting of the apparatus shown in FIG. 1.

Figure 5:
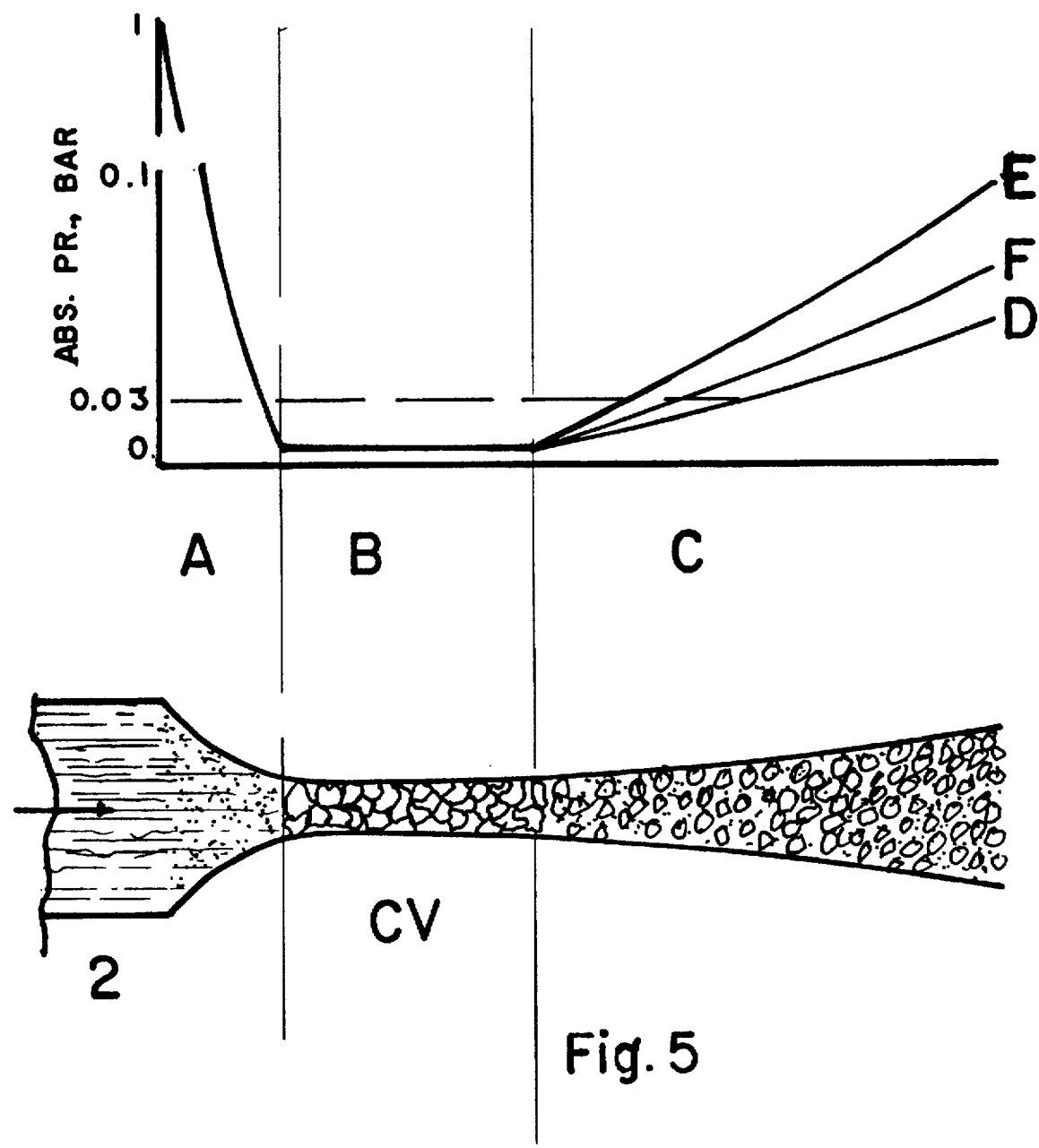
FIG. 5, shows a cross-section through a cavitating venturi, and above it possible pressure along its length.

One very important benefit of the system disclosed here is that the permanent gasses and volatile contaminants can be separated from the main liquid stream at a pressure much lower than necessary to volatilize the contaminating volatiles. The pressure is then raised in the diffuser of the cavitating venturi to a pressure just below that required to keep them in the gas mixture in the bubbles. Since most volatile liquids do not have an exact evaporation point—gasoline, for instance, is a mixture of many compounds—the result is that we can achieve maximum separation of the volatiles at a very low pressure while then raising them to as high a pressure as practicable. This has the very important advantage that the pressure increase in the vacuum pump, and so the power to drive it, will be minimized. The size of the compressor, an important cost factor, also can be minimized. This is illustrated for discussion in FIG. 5, to approximate scale, where the pressure along the length of a cavitating venturi is shown. In section A, the converging nozzle section a large portion of the dissolved gasses to be released are moved to very small bubbles. In the center, or coalescing section, C, massive steam bubbles are formed by dropping the pressure to any chosen value below the saturation temperature of the liquid. Much of the gasses in the micro bubbles formed in section A are incorporated into the massive steam bubbles (which can attempt, unsuccessfully of course, to achieve diameters of infinity if the pressure is just below the saturation pressure of the liquid) In the diffuser section, C, the pressure is raised to any desired value according to Bernoulli's theorem, avoiding excessive condensation (if that is the correct term) that would re-incorporate the volatilize gasses into the liquid. By controlling the pressure at the exit of the diffuser by suitably dimensioning the diffuser and discharging it at the desired pressure in the vacuum system, we can compress, for instance at a low pressure, D, or over-expand to a too-high pressure E or in a correct design, to a preferred pressure F, just high enough to avoid recondensation or perhaps re-solution in the liquid. Note also that the coalescing section of the cavitating venturi, B, need not be straight nor the pressure constant, but can be adjusted to reach almost absolute zero pressure, then increased to just below the saturation pressure to achieve maximum steam bubble size and so coalescence of the micro-gas bubbles. The steam re-condenses very early in the diffuser, section C, when the pressure rises above the liquid's saturation pressure.

FIGS. 6A, 6B, and 6C show 3 combinations of novel components revealed in the earlier FIGS. 1 through 4. Each combination achieves the important functions of releasing micro bubbles of gas from solution, coalescing part of them, then breaking the large bubbles formed by coalescence and sending their contents to a vacuum system in such a way as to avoid excessive evaporation of the liquid being cleansed or stripped of its permanent gasses.

The strength of the system can be understood by considering a possible need for separating helium, a permanent gas, and one or more of the more volatile fractions, say benzene, naphtha, etc, from a stream of crude oil. In the first stage, the final pressure at the discharge of the cavitating venturi's diffuser might be so high that any light fractions would be re-condensed and returned to the main stream, while the helium and other permanent gasses(for instance, air) are separated. The next stage could be designed to separate a more volatile fraction, the third stage a less volatile component, etc.

What I claim is:

1. A decontamination process for removing micro-bubbles of dissolved gasses and contaminants contained within a liquid flow, comprising the steps of:

(a) moving the flow through a venturi at a sufficient pressure and velocity to combine the micro-bubbles of gasses and contaminants into a multiplicity of coalesced bubbles, the venturi comprising an entrance integrated with a middle throat and diffuser end section, whereby the coalesced bubbles form in the throat and diffuser end section of the venturi, such that an exit flow from the venturi has a measurably decreased concentration of the micro-bubbles of gasses and contaminants when compared to the concentration at said entrance;

(b) concentrating the coalesced bubbles into a separate stream contained within a predetermined region of the venturi exit flow by directionally accelerating the venturi exit flow with a centrifugal separator;

(c) breaking the coalesced bubbles contained within the stream by impinging the coalesced bubbles against a surface, thereby releasing the gasses and contaminants;

(d) exposing the gasses and contaminants to a vacuum; and (e) guiding the flow through a disposal duct.

2. A method as recited in claim 1, wherein the step of separating the coalesced bubbles includes directing the venturi exit flow through a circular duct.

3. A method as recited in claim 1, wherein the step of separating the coalesced bubbles includes directing the venturi exit flow through a centrifugal pump that concentrates the coalesced bubbles within a duct interconnected to the vacuum system.

4. A decontamination process for removing micro-bubbles of gasses and contaminants contained within a liquid flow, comprising the steps of:

(a) moving the flow through a venturi at a sufficient pressure and velocity to combine the micro-bubbles of dissolved gasses and contaminants into a multiplicity of coalesced bubbles, the venturi comprising an entrance integrated with a middle throat and diffuser end section, whereby the coalesced bubbles form in the throat and diffuser end section of the venturi, such that an exit flow from the venturi has a measurably decreased concentration of the micro-bubbles of dissolved gasses and contaminants when compared to the concentration at said entrance.

(b) forcing the venturi exit flow through a rotating cylinder that circumvents a rotating parabolic cone, said parabolic cone having least diameter at a bottom and greatest diameter at a top, where the venturi exit flow is forced through the cylinder such that the flow moves longitudinally along the cone from the bottom to the top, whereby a majority of the coalesced bubbles collect on an outer surface of the cone and move to said top;

(c) flinging the coalesced bubbles present at the top of the parabolic cone into a co-rotating annulus exposed to a vacuum, such that a cleaned liquid containing measurably fewer coalesced bubbles resides in proximity to the top of the cone; and (d) scooping the cleaned liquid into a stationary duct for discharge.

5. A method as recited in claim 3, wherein the step of directing the venturi exit flow through a centrifugal pump includes rapidly rotating a shaft-driven impeller within the flow such that fluid is expelled radially outwards to the disposal duct without a measurable percentage of the coalesced bubbles, resulting in the coalesced bubbles' concentrating in the duct interconnected to the vacuum system.

6. A method as recited in claim 2, including the additional step of guiding the resulting flow from the disposal duct to one or more subsequent stages comprising steps (a) thru (e).

7. A method as recited in claim 6, wherein the additional step of guiding the resulting flow from the disposal duct to one or more subsequent stages comprising steps (a) thru (e) is repeated in series.

8. A method as recited in claim 4, including the additional step of guiding the resulting flow from the stationary duct to one or more subsequent stages comprising steps (a) thru (d).

9. A method as recited in claim 8, wherein the additional step of guiding the resulting flow from the stationary duct to one or more subsequent stages comprising steps (a) thru (d) is repeated in series.

* * * * *